(12) United States Patent
Selvam et al.

(10) Patent No.: US 11,663,915 B2
(45) Date of Patent: May 30, 2023

(54) DYNAMIC MODELING AND SIMULATION OF AN AUTONOMOUS VEHICLE FLEET USING REAL-TIME AUTONOMOUS VEHICLE SENSOR INPUT

(71) Applicant: Lyft, Inc., San Francisco, CA (US)

(72) Inventors: Krishna Selvam, San Francisco, CA (US); Nicholas Chamandy, San Francisco, CA (US); Jody Kelman, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 202 days.

(21) Appl. No.: 16/562,210

(22) Filed: Sep. 5, 2019

(65) Prior Publication Data

US 2020/0126417 A1 Apr. 23, 2020

Related U.S. Application Data

(63) Continuation of application No. 15/645,776, filed on Jul. 10, 2017, now Pat. No. 10,438,486.

(51) Int. Cl.
| | |
|---|---|
| *G05B 17/02* | (2006.01) |
| *G08G 1/00* | (2006.01) |
| *G06Q 50/30* | (2012.01) |
| *G08G 1/123* | (2006.01) |
| *G05D 1/02* | (2020.01) |
| *G05D 1/00* | (2006.01) |

(52) U.S. Cl.
CPC ............ *G08G 1/123* (2013.01); *G05B 17/02* (2013.01); *G05D 1/0088* (2013.01); *G05D 1/0291* (2013.01); *G06Q 50/30* (2013.01); *G08G 1/202* (2013.01)

(58) Field of Classification Search
CPC ........ G08G 1/123; G08G 1/202; G01C 21/00; G06Q 50/30; G05D 1/0291; G05D 1/0088; G05B 17/02
See application file for complete search history.

(56) References Cited

U.S. PATENT DOCUMENTS

| | | | |
|---|---|---|---|
| 2015/0039391 A1* | 2/2015 | Hershkovitz | G06Q 50/30 705/7.31 |
| 2018/0356821 A1* | 12/2018 | Kentley-Klay | B60W 30/00 |
| 2019/0146486 A1* | 5/2019 | Doster | G07C 5/008 701/29.3 |

* cited by examiner

*Primary Examiner* — Jeffrey C Boomer
(74) *Attorney, Agent, or Firm* — Baker Botts L.L.P.

(57) ABSTRACT

Embodiments provide techniques for autonomous vehicle fleet modeling and simulation, such as within a dynamic transportation matching system utilizing one or more vehicle types such as non-autonomous vehicles and autonomous vehicles. An autonomous fleet simulation model may be generated based on real-world parameters of an autonomous vehicle fleet, and the parameters may be modified in a simulation in order to determine optimized values that may be applied to the real-world autonomous vehicle fleet.

20 Claims, 8 Drawing Sheets

DYNAMIC MODELING AND SIMULATION OF AN AUTONOMOUS VEHICLE FLEET USING REAL-TIME AUTONOMOUS VEHICLE SENSOR INPUT

PRIORITY

This application is a continuation under 35 U.S.C. § 120 of U.S. patent application Ser. No. 15/645,776, filed 10 Jul. 2017.

BACKGROUND

Traditionally, transportation and related services have been provided by a human-operated vehicle. However, human operators may not choose to operate in an efficient manner. For example, human operators may not know of high demand areas, or demand trends, leading them to operate in lower demand areas. Additionally, human operators may prefer certain areas (such as areas close to home, areas to perform errands after rides, etc.) which may not lead to an efficient distribution of vehicles in a given region. Improvements in computer processing have led to increasing efforts to automate more of these services, using autonomous vehicles that do not require a human operator. The addition of autonomous vehicles to a transportation fleet also presents the problem of how to perform various activities autonomously that were previously performed by human drivers. Additionally, it can be difficult to determine how the autonomous vehicles should perform as part of the fleet, based on infrastructure placement, vehicle status, and other real-world information.

BRIEF DESCRIPTION OF THE DRAWINGS

Various embodiments in accordance with the present disclosure will be described with reference to the drawings, in which.

DETAILED DESCRIPTION

Figure 1:
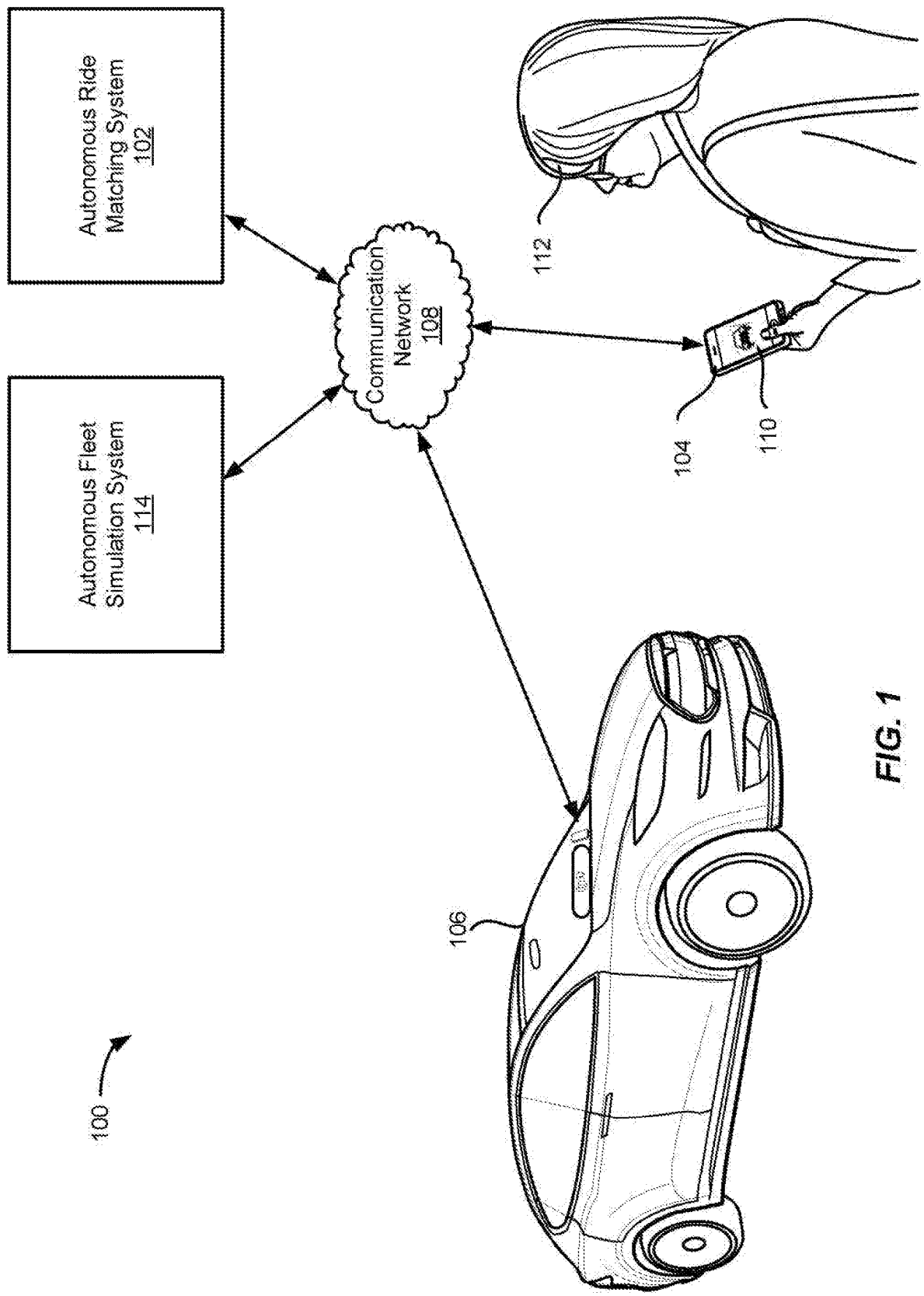
FIG. 1 illustrates an example of an autonomous ride matching system including a matched requestor and matched autonomous vehicle, in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments provide techniques, including systems and methods, of autonomous vehicle fleet modeling and simulation, such as within a dynamic transportation matching system (e.g., including an autonomous vehicle matching system) utilizing one or more vehicle types such as non-autonomous vehicles and autonomous vehicles. In an embodiment, a particular geographical region serviced by an autonomous fleet (e.g., a number of autonomous vehicles available to be dynamically matched to transportation/ride requests, which in an embodiment, comprises a portion of a larger fleet that includes autonomous and non-autonomous vehicles) is determined. For example, a particular geographic region may be a sub-region of a larger region that is available to be serviced by an autonomous fleet, and which in some embodiments is divided into various authorized and non-authorized zones, such as where autonomous vehicles are geo-fenced in order to allow or prevent operation in certain areas, such as to comply with local ordinances. In another embodiment, the autonomous vehicle fleet simulator may determine specific routes based on predetermined stops within a particular geofence. For example, it may be more efficient for groups of commuters who have similar commutes to be picked up and dropped off at predetermined stops along a specified commute route for the group as opposed to individual point-to-point routes for each commuter.

In an embodiment, autonomous fleet data is received, such as from an autonomous matching system and/or a dynamic transportation matching system, where autonomous fleet data may describe characteristics of various autonomous vehicles in the fleet, such as seating capacity, current and historical locations, ride status, vehicle status (e.g., charge status, fuel status, maintenance status, cleaning status). Various autonomous service entities in the geographic region are determined and represented in an autonomous fleet simulation model. For example, service entities may comprise charging stations, fueling stations, parking facilities, service facilities, cleaning facilities, and/or a combination of any of the aforementioned service entities. In an embodiment, an autonomous fleet simulation model can receive a series of inputs (e.g., current and/or historical data, substantially real-time sensor data from one or more vehicles), parameters of which can be modified in order to model various outcomes in a simulated autonomous vehicle fleet that is based on a current fleet. By modifying various parameters, potential outcomes can be predicted, such as minimizing total miles traveled, minimizing estimated times of arrival (ETA), minimizing non-ride time (e.g., time spent charging, fueling, idling, parked, in service, being cleaned, etc.). This virtual optimization of the autonomous fleet may be used to send instructions to the fleet (e.g., pre-positioning vehicles, sending vehicles for charging/fueling/service at various intervals, etc.) to ensure that the fleet is operating efficiently.

In an embodiment, an autonomous fleet simulation model may be used to determine potential locations of service entities (e.g., charging, parking, service, cleaning, etc.) within a geographic area serviced by the autonomous fleet. These locations, along with other parameters, can be used to determine optimal operating algorithms for the autonomous fleet to optimize along various dimensions such as cost per mile of operation, etc., such that instructions may be sent regarding what activity each of the autonomous vehicles in a fleet should be undertaking at any given time.

Accordingly, embodiments described herein provide technical advantages over traditional transportation services and provide technical solutions to problems with traditional transportation services. For example, embodiments of the autonomous fleet simulator gather, aggregate, and analyze real-time traffic, demand, and other environmental data to generate dynamic instruction plans and travel paths for a fleet of autonomous vehicles across a geographic region. As such, embodiments reduce travel time and delay, conserve the usage of energy and lead to more efficient usage of energy to power the autonomous vehicles (e.g., gas, electricity), optimize traffic flow, reduce human errors in driving and navigation, etc.

Additionally, traditional human operators of vehicles may prefer to provide services within familiar areas (such as areas close to home, areas to perform errands after rides, etc.), resulting in inefficient and sub-optimal distribution of vehicles in a given region. However, embodiments of the autonomous data fleet simulator determine how the autonomous vehicles should perform as part of the fleet across a larger area (e.g., beyond what one human operator would operate in) based on infrastructure placement, vehicle status, and other real-world information including historical ride data, request data, traffic data, etc. through a variety of different road conditions (e.g., weather, construction, etc.), times (e.g., high traffic times, low traffic times, etc.), events (e.g., concerts, sporting events, conferences, etc.), and any other variables that may affect transportation in an area.

Thus, embodiments allow dynamic transportation matching systems to more efficiently and effectively operate a distributed network of autonomous and non-autonomous resources (e.g., vehicles) by modeling the behavior of requests within a geographic region and optimizing the placement, servicing, and matching of vehicles to requests over a variety of different conditions and variables.

FIG. 1 illustrates an example of an autonomous ride matching service 100 including a matched requestor and matched autonomous vehicle, in accordance with an embodiment. A ride matching system 102 may be configured to communicate with both the requestor computing device 104 and autonomous vehicle 106. In various embodiments, autonomous vehicle 106 may include a communications device integrated into the autonomous vehicle that is configured to communicate with autonomous ride matching system 102. Additionally, or alternatively, a separate computing device operable to communicate with both the autonomous ride matching system 102 and the autonomous vehicle 106 may be used to control the autonomous vehicle. A requestor 112 may use a ride matching requestor application 110 on a requestor computing device 104 to request a ride at a specified pick-up location. The request may be transmitted over a communication network 108 to the autonomous ride matching system 102. In some embodiments, autonomous ride matching system 102 may manage both autonomous and non-autonomous vehicles. For example, depending on a requestor's pickup and/or drop-off locations, autonomous vehicles and non-autonomous vehicles may be available to complete the ride.

The autonomous ride matching system 102 may identify available autonomous vehicles that are within a predetermined distance and/or expected pickup time away from the requestor 112. The ride matching system 102 may send the ride request to autonomous vehicle 106 which may then proceed upon a route to the pickup location provided by requestor 108. The route may be determined by autonomous ride matching system 102, autonomous vehicle 106, or any combination thereof. As discussed further herein, autonomous vehicles may include various sensors that enable them to gather real-time information about road conditions, traffic patterns, vehicle status, etc. In some embodiments, between rides autonomous vehicles may be used to gather data along particular autonomous routes. This data may be sent from the autonomous vehicles to the autonomous ride matching system 102 over communication network 108. In some embodiments, all or a portion of this data may be made accessible to an autonomous fleet simulation system 114, which in some embodiments may be provided as part of autonomous ride matching system 102. For example, the autonomous fleet simulation system may take a number of inputs collected from the autonomous fleet and/or from administrators which describes the current autonomous deployment location and utilization, such as geographic data and any restrictions, fleet size, ride data, and/or infrastructure data. Other inputs can include data from other autonomous or non-autonomous vehicles on the road, such as real-time traffic data, infrastructure data, relative positioning, and/or timing between positions. The autonomous fleet simulation system may then use these inputs to create an autonomous model that simulates the autonomous fleet deployment. Using this model, various optimizations can be determined for the behavior of the autonomous vehicle fleet. The optimizations may be based on vehicle utilization (i.e., a percent of time a vehicle is used for a ride or a mileage of a vehicle that is from conducting a ride), time with passenger versus time empty, cost per mile, or other performance metrics.

In some embodiments, in addition to requests from requestors 112, service facilities 116 may also request an autonomous vehicle 106. For example, a gas station, charging station, a parking facility, a cleaning facility, or a maintenance facility may send a notification indicating availability at the facility. The facility may notify the autonomous ride matching system of available capacity to service vehicles. The autonomous ride matching system may then match vehicles for service as those vehicles require service. For example, autonomous ride matching system 102 may receive data from a vehicle sensor in autonomous vehicle 106 indicating that the autonomous vehicle requires service. Autonomous ride matching system 102 may then match the autonomous vehicle to a service facility 116 which has indicated it has available space and can perform the appropriate service for the autonomous vehicle. In some embodiments, vehicle sensors (e.g., weight sensors, moisture sensors, etc.), and/or in-vehicle cameras, and/or feedback submitted by the user, may be used to dispatch a vehicle to a cleaning facility. Different cleaning facilities may be capable of performing different cleaning services (e.g., wet cleans vs. dry cleans).

Figure 2:
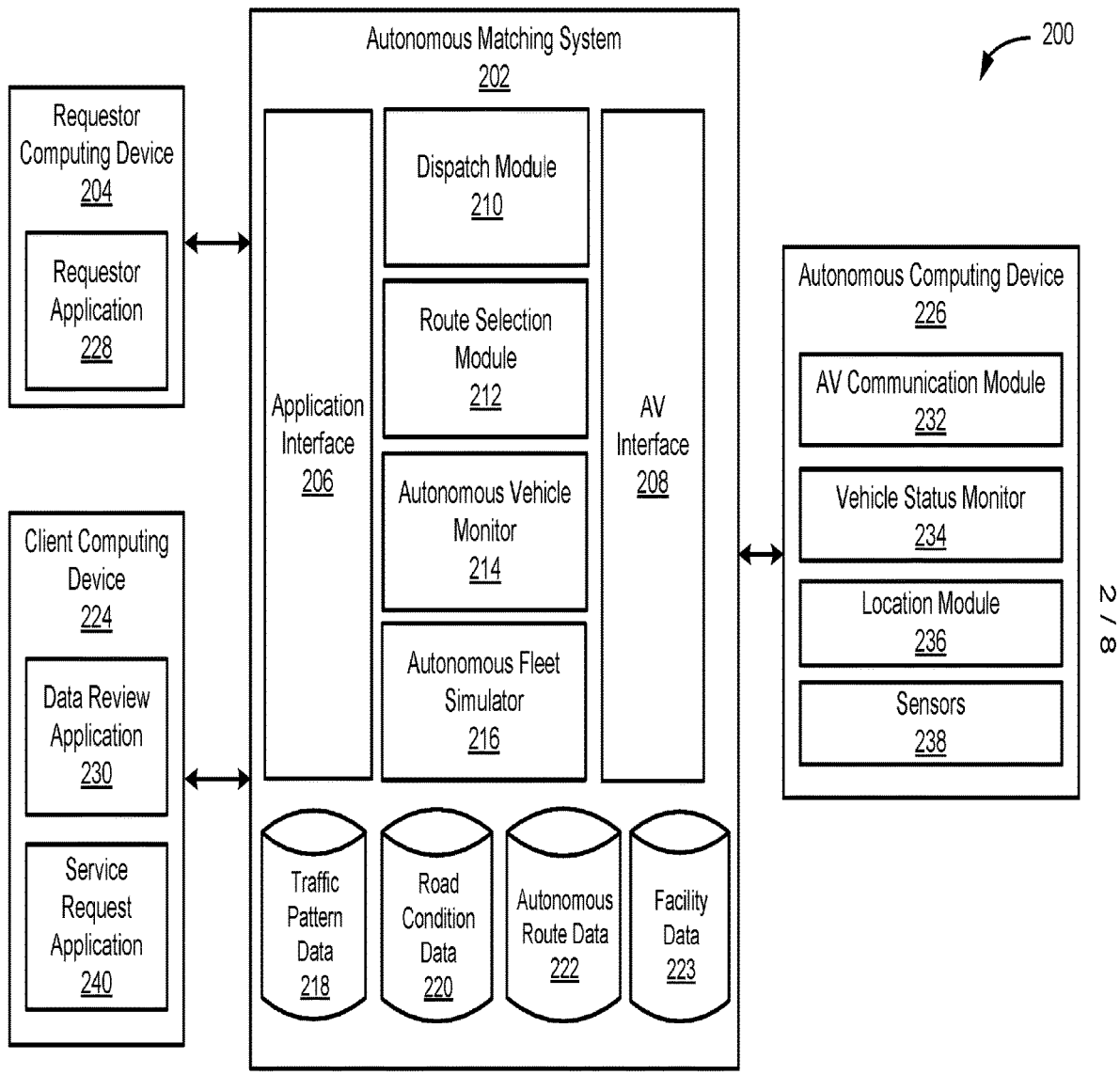
FIG. 2 illustrates an example block diagram of an autonomous ride system, in accordance with an embodiment.

FIG. 2 illustrates an example block diagram 200 of an autonomous ride system, in accordance with an embodiment. As described above, the autonomous matching system 202 may identify and facilitate ride matching requests received from requestor computing devices 204 with available providers, such as autonomous vehicles. The autonomous matching system 202 may include an application interface 206, an autonomous vehicle (AV) interface 208, a dispatch module 210, a route selection module 212, an autonomous vehicle monitor 214, and an autonomous fleet simulator 216. The autonomous matching system 202 may also include a traffic pattern data store 218, a road condition data store 220, an autonomous route data store 222, and facility data store 223, each of which may be used by any of the modules of the autonomous matching system 202 to obtain information in order to perform the functionality of the corresponding module. The autonomous matching system 202 may be configured to communicate with a plurality of requestor computing devices 204, client computing devices 224, and autonomous computing devices 226 or other computing devices. Autonomous computing device 226 may be a computing device integrated with an autonomous vehicle, such as an in-vehicle computing device configured to control the autonomous vehicle. In some embodiments, autonomous computing device 226 may be a separate communications device configured to facilitate communication between the autonomous matching system 202 and an autonomous vehicle. Although the autonomous matching system 202 is shown in a single system, the autonomous matching system 202 may be hosted on multiple server computers and/or distributed across multiple systems. Additionally, the modules may be performed by any number of different computers and/or systems. Thus, the modules may be separated into multiple services and/or over multiple different systems to perform the functionality described herein.

The application interface 206 may include any software and/or hardware components configured to send and receive communications and/or other information between the autonomous matching system 202 and a plurality of requestor computing devices 204 and client computing device 224. The application interface 206 may be configured to facilitate communication between the autonomous matching system 202 and a requestor application 228 operating on a requestor computing device 204 and/or a data review application 230 on client computing device 224. In various embodiments, the requestor computing device 204 may represent a personal computing device of a user, used to request a ride service from autonomous matching system 202. Client computing device 224 may represent any computing device operable to access data maintained by autonomous matching system 202 and collected by autonomous computing device 226.

The application interface 206 may be configured to periodically receive ride requests, location information, a request location (also referred to as a "pick-up" location), a drop-off location, a ride type, autonomous vehicle operating instructions, autonomous ride information, and/or any other relevant information from the requestor computing device 204 when the requestor application 228 is active on the requestor computing device 204. A ride request may include a requestor identifier, location information for the requestor computing device 204, a pick-up location for the ride request, one or more drop-off locations, a pick-up time, and/or any other suitable information associated with providing a service to a requestor. The ride request may be sent in a single message or may include a series of messages. Additionally, the application interface 206 may be configured to send ride match messages, autonomous vehicle location information, travel routes, pick-up estimates, traffic information, requests for autonomous ride instructions, autonomous vehicle status information, updates/notifications, and/or any other relevant information to the requestor application 228 of the requestor computing device 204. In some embodiments, requestor application 228 may be configured to display one or more available routes to the requestor between the requestor's pickup location and drop-off location. The requestor may select one of the routes, causing a message indicating the selected route to be sent to autonomous matching system 202. Based on the selected route, dispatch module 210 can dispatch an autonomous vehicle to the pickup location with an instruction to follow the selected route. Route selection module 212 may then update autonomous route data store 222 to indicate when the route was last travelled by an autonomous vehicle.

In various embodiments, a requestor computing device 204 and/or client computing device 224 may include any computing device that is configured to communicate with autonomous matching system 202 and/or autonomous computing device 226 over one or more communication networks. The requestor computing device 204 and/or client computing device 224 may comprise a processor, a computer-readable memory, and communication hardware and/or software to allow the requestor computing device 204 and/or client computing device 224 to communicate over one or more communication networks. For example, a requestor computing device 204 and/or client computing device 224 may include a mobile phone, a tablet, a smart watch, a laptop computer, a desktop computer, and/or any other suitable device having a processor, memory, and communication hardware.

In some embodiments, requestor computing device 204 is configured to communicate with the autonomous matching system 202 in order to request a service. The requestor computing device 204 may include communication components that allow the requestor computing device to communicate over one or more communication networks to the autonomous matching system 202 and/or the autonomous computing device 226. In some embodiments, the requestor computing device 204 may communicate directly with autonomous computing device 226. For example, requestor computing device 204 may pair with autonomous computing device 226 over Bluetooth or other wireless communication system, to exchange information, provide ride instructions, receive ride information and updates, etc. The requestor computing device 204 may also include a location module to allow the requestor computing device 204 to determine its current location and/or position. For example, the location module may implement global positioning system (GPS), cellular communications triangulation, and/or any other suitable location-based techniques to determine the coordinates or location of the requestor computing device 204. The requestor computing device 204 may include a display which may include any suitable components to create visible light. For example, the display may include LED arrays, a LCD display, a projector, and/or any other components that create visible light, pixels, and/or images. In various embodiments, the display may also operate as a touchscreen interface through which user inputs may be received to, e.g., provide pickup and drop-off locations, request to begin or end an autonomous ride, etc.

In some embodiments, AV interface 208 may include any software and/or hardware configured to send and receive communications and/or other information between the autonomous matching system 202 and a plurality of autonomous computing devices 226. The AV interface 208 may be configured to periodically receive location information, vehicle and/or ride status information, and/or any other relevant information from the autonomous computing device 226. Additionally, the AV interface 208 may be configured to send ride requests, requestor location information, pick-up locations, travel routes, pick-up estimates, traffic information, provider updates/notifications, autonomous vehicle operating instructions, and/or any other relevant information to the autonomous computing device 226.

In some embodiments, autonomous computing device 226 can be an in-vehicle computing device, such as any computing device that is configured to communicate with autonomous matching system 202 and/or requestor computing device 204 over one or more communication networks. The in-vehicle computing device may comprise a processor, a computer-readable memory, and communication hardware and/or software to allow the autonomous computing device 226 to communicate over one or more communication networks. In some embodiments, the autonomous computing device 226 can be integrated into the autonomous vehicle's computer system, such as a part of the autonomous vehicle's data processing and control system and made user accessible through a display or other user interface device built into the autonomous vehicle (e.g., in-dash, console, seatback, or other location). Examples of an autonomous computing device 226 may include, but are not limited to, a mobile phone, a tablet, a smart watch, a laptop computer, a desktop computer, and/or any other suitable device having a processor, memory, and communication hardware.

In some embodiments, the autonomous computing device 226 may include an autonomous vehicle communication module 232 that is configured to manage communications with the autonomous matching system 202 and other autonomous computing devices. In various embodiments, AV communication module 232 can provide vehicle, location, and travel data to autonomous matching system 202. In some embodiments, an autonomous computing device 226 can connect directly to other nearby autonomous computing devices to share location and travel data. In some embodiments, the autonomous computing devices can form a mesh network to share travel data as well as network connections to access autonomous matching system 202. Travel data can be collected by vehicle status monitor 234, which can record information related to the utilization of the autonomous vehicle. In some embodiments, vehicle status monitor 234 can record one or more of the number of rides completed by the autonomous vehicle, the number of miles traveled, the time elapsed and other travel information since the autonomous vehicle last received maintenance. In some embodiments, vehicle maintenance codes, such as codes associated with a check engine light, oil pressure, oil level, gas level, etc. may also be recorded by vehicle status monitor 234. In some embodiments, vehicle information can be collected from the vehicle itself (e.g., via the controller area network (CAN)-bus or from APIs provided by the vehicle manufacturer, which may send data directly to an in-car console or to the autonomous matching service. Location module 236 may implement global positioning system (GPS), cellular communications triangulation, sensor based localization techniques, and/or any other suitable location-based techniques to determine the coordinates or location of the requestor computing device autonomous computing device 226.

In some embodiments, autonomous computing device 226 can request service based on data recorded by vehicle status monitor 234. The request may be sent to autonomous matching system 202 which may notify a service facility. In some embodiments, a service facility may include a client computing device 224 including a service request application 240. The service request application 240 may notify the autonomous matching system 202 of availability, service type, etc. In various embodiments, service facilities may be specialized to perform specific service types (e.g., autonomous vehicle maintenance, vehicle maintenance, body repair). The autonomous ride matching system may then match an autonomous vehicle to the service facility. In some embodiments, facility data may be maintained in a facility data store 223. When a facility is matched to an autonomous vehicle, information relevant to that facility may be looked up in the facility data 223. For example, if an autonomous vehicle is matched to a parking facility, the location (e.g., latitude and longitude) of that facility, the size of the facility, and/or availability data may be retrieved from facility data 223. Similarly, facility data may be looked up for a charging, cleaning, and/or a maintenance facility, such as size, location, services provided, etc. For example, a charging facility may be associated with data describing the type of charging available (e.g., standard charger such as an L2 changer, or a fast charger such as a DC charger) and type of charging station (e.g., manual or automatic). In some embodiments, charging facility data may also include typical charge times for different types of autonomous vehicles, how long a typical charge will last in different autonomous vehicles, and/or a charge history for vehicles that have used that charger. Similarly, a cleaning facility may be associated with data describing the types of cleaning services, and typical cleaning times. Parking facilities may be associated with typical parking availability at different times of day, parking locations, idle locations, maximum parking or idling times, etc. The autonomous vehicle may accept the request and navigate to the service facility. In some embodiments, the autonomous matching system 202 may identify the service facility based on one or more constraints, such as time of day, date, service requested, etc.

Sensors 238 may include one or more sensors, or sensor arrays, used to identify objects around the autonomous vehicle, as well as the roadway, lane, direction, location, and other objects and roadway conditions the autonomous vehicle may encounter. Sensors 238 may include electromagnetic sensors, including RADAR, LiDAR, infrared, ultraviolet, optical, and other sensors, acoustic sensors, position sensors, and other sensors. Sensors 238 may also include multi-axis accelerometers, weight scales, moisture sensors, in-vehicle cameras, and other sensors configured to monitor the interior status, contents, and motion of the autonomous vehicle. For example, accelerometers may measure the motion of the autonomous vehicle's cabin as it travels on different roads. Roads in poorer condition, with more pot holes, uneven surfaces, roadway patches, etc. may lead to a rougher ride as measured by sensors 238. In some embodiments, scales may be used to monitor seats, floors, and other user-accessible areas of the autonomous vehicle's cabin and may detect whether the weight of the cabin has changed, indicating a potential lost item left behind by a passenger or a potential spill. The sensor data may be stored in traffic pattern data store 214 and road condition data store 220, for further analysis by client computing device 224. Although shown as distinct data stores, in various embodiments, traffic pattern data and road condition data, along with raw sensor data, location data, and/or any other type of data gathered by the autonomous ride matching system may be maintained in a single data store, such as an autonomous ride data store.

In some embodiments, dispatch module 210 may include a software module that is configured to process ride requests, ride responses, and other communications between requestors and providers of the autonomous matching system 202 to match a requestor and a provider for a requested service. For example, a ride request can be received from requestor computing device 204, the ride request can include a pickup and a drop-off location or locations. In some embodiments, dispatch module 210 can be configured to determine a dispatch type for a ride request based on criteria associated with the route and/or the requestor. For example, the ride request may be originating in an area not served by autonomous vehicles, or the requestor's account may be associated with preference data indicating that human-driven vehicles should be preferentially dispatched whenever possible. Dispatch module 210 may send an instruction to an autonomous computing device 226 associated with an autonomous vehicle to go to the pickup location based on the criteria associated with the route and/or requestor. In some embodiments, a particular route may be determined by route selection module 212. For example, route selection module 212 may identify one or more autonomous routes from autonomous route data 222 to use based on current traffic, weather, or other roadway conditions. Additionally, or alternatively, route selection module may be configured to select a default route for an autonomous vehicle based on how recently data was collected for that route.

In some embodiments, one or more autonomous routes may be defined in data store 222. These autonomous routes may be defined from designated pickup and drop-off locations in a given geographic area. If the pickup and drop-off locations received in the ride request are each within one or more threshold distances of the designated pickup and drop-off locations, the autonomous ride type may be presented as an option to the requestor. The autonomous routes may include information on which roads are open or closed, road and traffic conditions based on weather, or traffic based on the time of day of the request (e.g., rush hour times during the weekday). For example, an autonomous route may be mapped such that in the financial district of San Francisco, during the hours of 9 am to 8 pm, autonomous vehicles are advised to only turn right when driving on Market St. Additionally and/or alternatively, autonomous regions may be defined in data store 222 for a given geographic region. Each autonomous region may be associated with mapping, driving, and/or roadway conditions that allow autonomous vehicles to navigate between most locations within the region.

In some embodiments, autonomous vehicle monitor 214 may request vehicle status information from each autonomous computing device 226. When an autonomous vehicle has completed a ride, autonomous vehicle monitor can determine whether the autonomous vehicle can be made available for additional rides or needs to be sent in for maintenance. For example, autonomous vehicle monitor 214 can maintain status thresholds and/or status rules. Status thresholds can be defined for various metrics collected by vehicle status monitor 234 including, but not limited to, driving time, number of rides, number of miles, etc. The vehicle status information received from vehicle status monitor 234 can be compared to the thresholds. If one or more metrics have exceeded a threshold, the autonomous vehicle can be routed to a maintenance location. Additionally, or alternatively, status rules may be defined for vehicle maintenance codes including, but not limited to, check engine codes, tire pressure codes, oil level codes, etc. If a maintenance code is sent from the vehicle status monitor 234, it can be compared to the status rules and, if it satisfies one of the rules, the autonomous vehicle can be routed to a maintenance location. For example, each maintenance code may be associated with a different value indicating whether the maintenance needs to be performed immediately or whether the maintenance can be deferred (e.g., "high," "medium," or "low;" a numerical 1-10, or other value). The autonomous ride matching system may determine maintenance needs across the current fleet of vehicles and determine whether to route the vehicle for maintenance. For example, if the current number of vehicles in maintenance is high, and the maintenance code is associated with a "low" value, the maintenance may be deferred until maintenance has been completed on other vehicles. In some embodiments, vehicle status monitor may also be configured to request cleaning services based on data collected by sensors 238. For example, if the sensors detect vehicle conditions indicating a cleaning issue, such as a spill, vehicle status monitor 234 may send a request to autonomous matching system 202 indicating that the autonomous vehicle requires cleaning. This request may include a cleaning type, such as wet cleaning or dry cleaning. Dispatch module 210 may determine a cleaning facility that provides the appropriate cleaning service and then may dispatch the autonomous vehicle to the cleaning facility.

Figure 3:
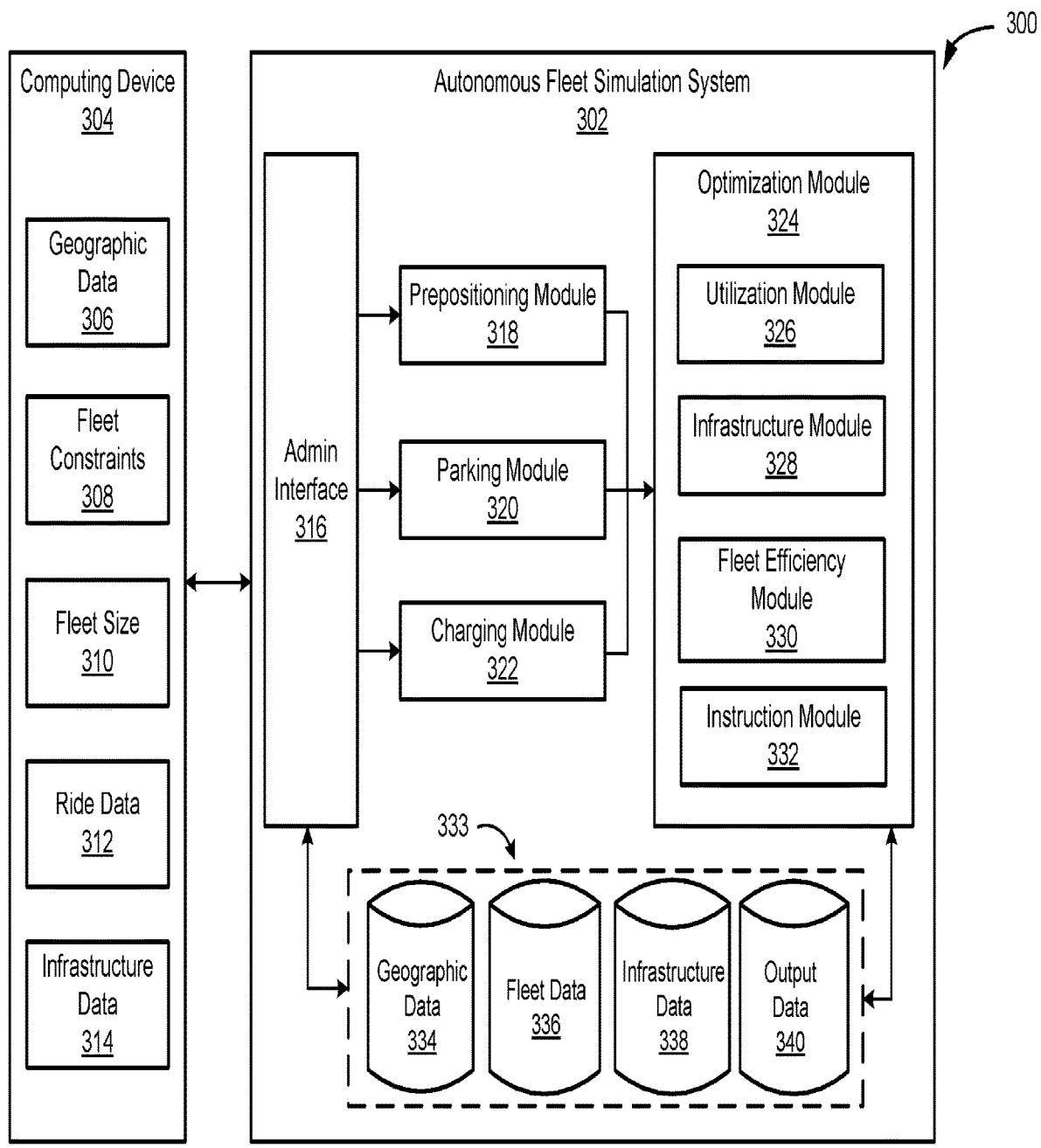
FIG. 3 illustrates an example block diagram of an autonomous fleet simulation system, in accordance with an embodiment.

In some embodiments, autonomous fleet simulator 216 may generate an autonomous fleet simulation model and/or utilize an autonomous fleet simulation model from an autonomous fleet simulation system (shown in FIG. 3). The autonomous fleet simulation model may describe and utilize data, such as data gathered by requestor computing device 204, client computing device 224, and autonomous computing device 226, as well as current and historical data stores associated with autonomous matching system 202. In one embodiment, the autonomous matching system 202 may dynamically match non-autonomous vehicles to transportation requests using data from a dynamic transportation matching system, which in various embodiments may be separate from or part of autonomous matching system 202. For example, autonomous fleet simulator 216 may simulate a model of a dynamic transportation matching marketplace, which may comprise various entities such as passengers, drivers, ride requests, provider vehicles, etc. Autonomous fleet simulator 216 may take data about a marketplace and allow for various variables to be modified without affecting actual entities in a marketplace, and see how modifying aspects of a marketplace may affect measurable values such as ETA, ride conversion, etc. For example, how many more transportation requests could be serviced if the number of autonomous vehicles in a particular geographic region were increased by X percent.

In an embodiment, various entities may be added to autonomous fleet simulator 216 that may be particular to an autonomous vehicle fleet, such as autonomous service facilities (e.g., charging stations, fueling stations, parking areas, maintenance stations, cleaning stations, etc.), as may be described in facility data 223, along with parameters describing parameters and/or requirements associated with the entities (e.g., charging times, capacity of a maintenance facility, etc.). An embodiment simulates "rides" to these and other types of facilities in order to determine an optimized schedule that, in an embodiment, minimizes a total number of miles traveled by an autonomous vehicle fleet. Based on the simulated rides, instructions for the actual autonomous vehicle fleet may be sent and implemented in actual practice.

In an embodiment, autonomous fleet simulator 216 may determine, using an optimization algorithm, locations at which to "pre-position" autonomous vehicles to increase a likelihood that an autonomous vehicle will be in position for a future transportation request. Unlike human-driven non-autonomous vehicles that appear in a dynamic transportation matching system (e.g., including an autonomous matching system 202) wherever the non-autonomous vehicles happen to be at the time the human driver "comes online" (e.g., indicates in an app that she is willing to receive transportation requests), autonomous vehicles may begin a "workday" in the same place (e.g., a parking facility). It may be inefficient to set all autonomous vehicles located in one parking facility as eligible to accept transportation requests immediately upon leaving the parking facility; for example, there may not be many requests in the area around the parking facility, and sending autonomous vehicles to drive randomly until a transportation request is received that is closest to a random autonomous vehicle may prove to be inefficient. Therefore, autonomous vehicles may be "pre-positioned," such that a certain number of autonomous vehicles are sent to various locations around a geographic area in order to be available to service transportation requests in that area that will occur in the future. The pre-positioning of the autonomous vehicle may occur at any suitable time (e.g., at 4:30 before rush hour starts or at the end of the day), over any suitable period (e.g., every hour), and/or in response to any suitable condition being met (e.g., a ride ending, a vehicle being serviced, a vehicle being charged).

In an embodiment, autonomous fleet simulator 216 may simulate placement and parameters of autonomous service facilities. For example, if a charging/fueling facility has a certain number of charging stations that can charge in X hours and a certain number of charging stations that can charge in Y hours, then a simulated charging station of those parameters can be placed in different locations in the model in order to see the effect on various variables such as total number of miles of the autonomous fleet traveled prior to charging, change in revenue due to the simulated charging location, etc. In an embodiment, past supply and demand metrics and ride distribution data may be used to evaluate potential scenarios where demand increases 200% in a particular area of a geographic region. For example, the autonomous fleet simulator 216 may use data from previous autonomous rides as well as non-autonomous rides to determine how many additional vehicles would be needed to service such increased demand, and potential mixes of the additional vehicles may be simulated (e.g., how many autonomous vehicles vs. non-autonomous vehicles should be inserted into the marketplace). In another embodiment, the autonomous fleet simulator may determine when (e.g., what time of the day) a vehicle should charge based on demand for rides, rate of energy consumption for the vehicle per ride, tradeoffs between time spent charging and time used for a ride, and/or other factors. For example, it may be determined that it is advantageous, efficient, and more cost effective for the vehicle to charge during a time when the demand for rides across the entire fleet of autonomous vehicles is reduced.

In an embodiment, autonomous fleet simulator 216 may model certain decisions about whether to place autonomous vehicles into service in an area under certain supply/demand scenarios. For example, a ride may have a time and/or distance to the pick-up location that is too high to make a profit on the ride, so the autonomous vehicle may be better used if it remains stationary (e.g. idling, parked, etc.) in order to service future demand, which would result in an optimization of a total miles traveled metric for an autonomous vehicle fleet. By simulating these conditions, instructions may be sent to the autonomous vehicle fleet that would result in improved decision making in the real-world when faced with similar decisions.

In an embodiment, autonomous fleet simulator 216 may model various maintenance, charging, cleaning, and other fixed schedules that may apply to an autonomous fleet. For example, a maintenance schedule may mandate that engine oil of an autonomous vehicle is changed every 3,000 miles traveled. The autonomous fleet simulator 216 may model a maintenance schedule that changes engine oil every 4,000 miles in order to determine effects on variables such as supply, revenue, miles traveled between maintenance incidents, etc. As another example, half of an autonomous vehicle fleet may have their maintenance schedules increased and the other half decreased, with a resulting effect on demand being simulated based on prior data. In an embodiment, an effect on staggering charging of an autonomous vehicle fleet may be simulated. For example, instead of a current practice that may include only charging an autonomous vehicle when its battery reaches 10% full, a simulation may be run whereby autonomous vehicles in a fleet are randomly selected for charging notwithstanding their current location or charge level. For example, 1% of an autonomous vehicle fleet may be randomly sent for charging every hour in a simulation, with a predicted effect on variables being modeled and refined so that optimized rules may be sent to the autonomous vehicle fleet in the real-world. In some embodiments, the autonomous fleet simulator 216 may operate in an on-line or off-line mode, either internally or externally to the autonomous matching system 202 in FIG. 2. Additionally and/or alternatively, the autonomous fleet simulator 216 may be operated by or in conjunction with a separate entity or system, such as an autonomous fleet simulation system shown in FIG. 3.

FIG. 3 illustrates an example block diagram 300 of an autonomous fleet simulation system 302, in accordance with an embodiment. In an embodiment, autonomous fleet simulation system 302 can pull production level data from computing devices 304, for example autonomous computing devices 226, autonomous matching system 202, etc. Example data available to be received from computing devices may include data stores such as geographic data 306. For example, data describing an overall geographic area (e.g., San Francisco) within which the particular autonomous vehicle utilizing the computing device 304 is operating, as well as an overall geographic area within which an autonomous vehicle fleet operates. In an embodiment, data describing fleet constraints 308 may describe various limitations placed on autonomous vehicles in an autonomous vehicle fleet. For example, certain autonomous vehicles may only be authorized or configured to operate within a sub-area of the overall geographic area serviced by the autonomous vehicle fleet (e.g., within a certain neighborhood of San Francisco, only on certain streets, etc.). In an embodiment, data describing fleet size 310 may describe a size of the autonomous fleet in that geography, a size of the traditional (i.e., human operator) fleet in that geography, etc. In an embodiment, ride data 312 may describe aspects of all "rides" in the geography; for example, rides matched by a dynamic transportation matching system and/or autonomous matching system. This may include data about number of passengers, ETAs, revenue/expenses/profits per ride, times associated with rides (start, end, duration), miles traveled to/from/during a ride, etc. This ride data 312 be actual or scaled to a certain percentage. In an embodiment, infrastructure data 314 may describe locations, sizes, and costs of various autonomous service entities such as parking facilities, charging/fueling facilities, maintenance/cleaning facilities, etc. Additionally, infrastructure data 314 may describe parameters for autonomous service entities such as charging/fueling times per vehicle, charge thresholds for vehicles (i.e., a charge level at which a vehicle needs to be charged), permissible idling time of a vehicle (i.e., how long it can idle after a ride), etc.

Data such as that described above may be utilized as inputs 306-314 to an autonomous fleet simulation system 302, and in various embodiments may be configurable (e.g., time to charge, time for service, etc.), while some inputs may be set by algorithms (e.g., when to charge, when to start, how to preposition, etc.). The inputs 306-314 can be used to create an autonomous fleet simulation model 333 that characterizes the current marketplace. In a current real-world model, real world data may be used to keep the model 333 up to date. In an autonomous marketplace, real world autonomous data may similarly be used to train the model 333.

In an embodiment, the real world autonomous data and inputs may be used to generate a model 333, or a preexisting non-autonomous model can be updated to account for the new autonomous fleet and behaviors, for example through various settings implemented by an admin interface 316. In an embodiment, an autonomous fleet simulation model 333 may be based on various data, such as that received from computing device 304. For example, geographic data 334 may be a set of data including various geographic data 306 received from autonomous vehicles. Fleet data 336 may include data received describing fleet constraints 308, fleet size 310, and ride data 312. Infrastructure data 338 may include infrastructure data 314 from multiple autonomous vehicles, for example. In an embodiment, data associated with the model may be provided to modules that allow for simulation of activities such as prepositioning 318, parking 320, and charging 322 to the input data 334-340. In an embodiment, these modules 318-322 include algorithms used to determine how autonomous vehicles perform, such as following/before a ride. For example, if a vehicle follows more efficient algorithms, it will spend less time circling looking for rides, more time in rides, and less time charging to achieve the same charge levels.

In an embodiment, prepositioning module 318 may be used to maximize revenue-generating miles and minimize total dead (i.e., non-revenue-generating) miles traveled for the fleet. For example, optimizing for a single vehicle may not optimize the fleet. A bipartite matching process that attempts to match each vehicle with one or more potential transportation requests may be performed at various intervals. For example, by knowing current vehicle locations and maintaining a list of possible future locations, each current location may be optimized with regard to each future location based on expected demand across the fleet of autonomous vehicles. An optimal future location for any particular autonomous vehicle may be determined based on such as bipartite matching approach, and instructions provided to autonomous vehicles to position themselves accordingly before any match.

In an embodiment, charging module 322 can determine potential charging schedules based on availability, cost, future demand, etc. In an embodiment, parking module 320 can determine when a vehicle should be parked, such as based on current idle time (e.g., configured to reach a maximum before parking). Parking and/or charging may also be determined based on a configurable number of how many vehicles should be parked or charging at any given time.

In an embodiment, an optimization module 324 determines effects of various modified parameters on variables describing the marketplace. For example, how can behavior of an autonomous fleet be modified in order to maximize utilization (e.g., total miles traveled, total rides provided, etc.). Optimizations may be performed along various dimensions. For example, utilization module 326 may determine predicted utilization changes based on modifications to the model 333. For example, by changing a vehicle charging schedule, it may be determined whether one or more autonomous vehicles in the autonomous fleet can spend more travel time/miles in a matched ride. Infrastructure module 328 may determine how modifications to locations/parameters of autonomous service entities can be optimized (e.g., where to locate charging/parking/maintenance facilities to be most efficient). Fleet efficiency module 330 may optimize other aspects of an autonomous fleet, such as fleet size. Instruction module 332 may generate autonomous fleet instructions based on the model 333 and the optimization module 324. For example, a simulation of the model 333 may indicate that half the autonomous fleet should be charged every other day. Instruction module 332 in an embodiment identifies autonomous vehicles in the autonomous fleet and generates instructions to be sent to the vehicles to implement the simulated behavior in the real-world. A simulation may be utilized to optimize the overall efficiency of the autonomous network, as well as to optimize specific decisions within it, such as charging behavior, parking behavior, and pre- and post-ride positioning. Output data 340 from the model is generated based on various parameters of the simulation. Example output data may include such variables as: total and/or average ETA, number of ride miles a vehicle drives per day, number of non-ride miles a vehicle drives per day, number of rides serviced, time charging, time prepositioning, time parked, time in ride, time en route to ride, total cost of the system, total fixed cost of the system (e.g., facilities, vehicles, etc.), and total variable cost of the system (e.g., mileage, fuel, etc.).

Figure 4:
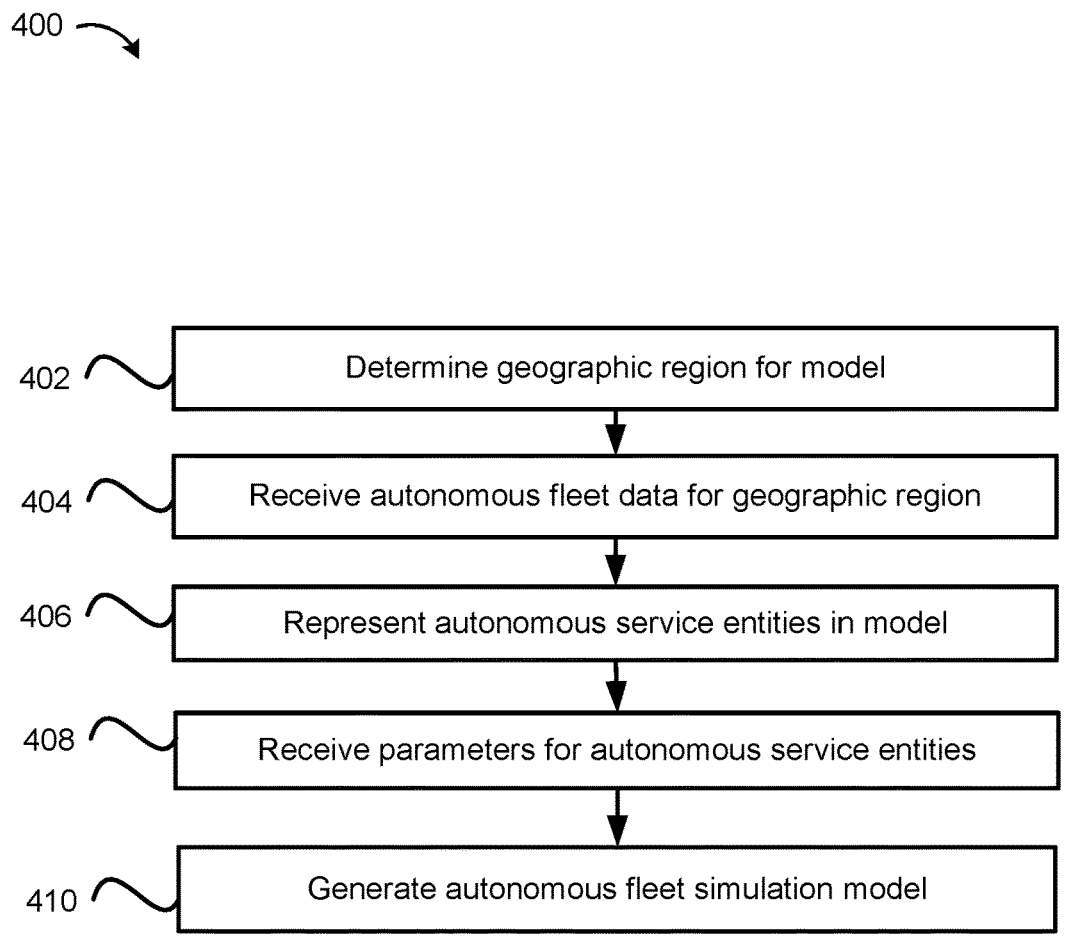
FIG. 4 illustrates an exemplary flow diagram of a method of autonomous fleet simulation modeling, in accordance with an embodiment.

FIG. 4 illustrates an exemplary flow diagram of a method of autonomous fleet simulation modeling, in accordance with various embodiments. It should be understood that, for this and other processes discussed herein, there can be additional, fewer, or alternative steps, performed in similar or alternative steps, or in parallel, within the scope of the various embodiments unless otherwise stated. At step 402, a geographic region for an autonomous fleet simulation model is determined. For example, a particular autonomous (and non-autonomous) marketplace may encompass a large geographic area as well as multiple discrete geographic areas. A model may be constrained to be based on various parameters relevant to a particular geographic region of a geographic area associated with a dynamic transportation matching marketplace that encompasses autonomous vehicles and in some embodiments, non-autonomous vehicles.

At step 404, autonomous fleet data for the geographical region is received. For example, data corresponding to one or more autonomous vehicles servicing the geographic region is received. This data may include autonomous vehicle deployment locations, autonomous vehicle fleet size, current autonomous vehicle utilization, historical autonomous vehicle utilization, autonomous vehicle route data, autonomous vehicle ride data, and the like, such as discussed with respect to FIGS. 2 and 3.

At step 406, autonomous service entities in the geographical region may be represented in the autonomous fleet simulation model. For example, charging/fueling locations, parking locations, maintenance/cleaning locations, and the like. Each autonomous service entity may provide one or more types of service; for example, parking, charging, fueling, cleaning, repair, updating (e.g., software, components, etc.), or maintenance (e.g., scheduled, required, etc.).

At step 408, autonomous service parameters for the autonomous service entities may be received. In an embodiment, such parameters may include the various types of service provided by the autonomous service entity, times of and/or time required for each type of service, a number of autonomous vehicles capable of receiving the type of service at the particular autonomous service entity, etc.

At step 410, an autonomous fleet simulation model may be generated, for example for the geographical region and being based on autonomous fleet data, autonomous service entities, and/or autonomous service parameters, as well as other types of parameters and/or data described more fully herein. In an embodiment, an autonomous fleet simulation model can utilize a series of inputs (e.g., current and/or historical data, substantially real-time sensor data from one or more vehicles). The parameters of the inputs can be modified in order to dynamically update the model to simulate various outcomes in a simulated autonomous vehicle fleet that is based on a current fleet. By modifying various parameters, potential outcomes can be predicted, such as minimizing total miles traveled, minimizing estimated times of arrival (ETA), minimizing non-ride time (e.g., time spent charging, fueling, idling, parked, in service, being cleaned, etc.). This virtual optimization of the autonomous fleet may be used to send instructions to the fleet (e.g., pre-positioning vehicles, sending vehicles for charging/fueling/service at various intervals, etc.) to ensure that the fleet is operating efficiently.

Figure 5:
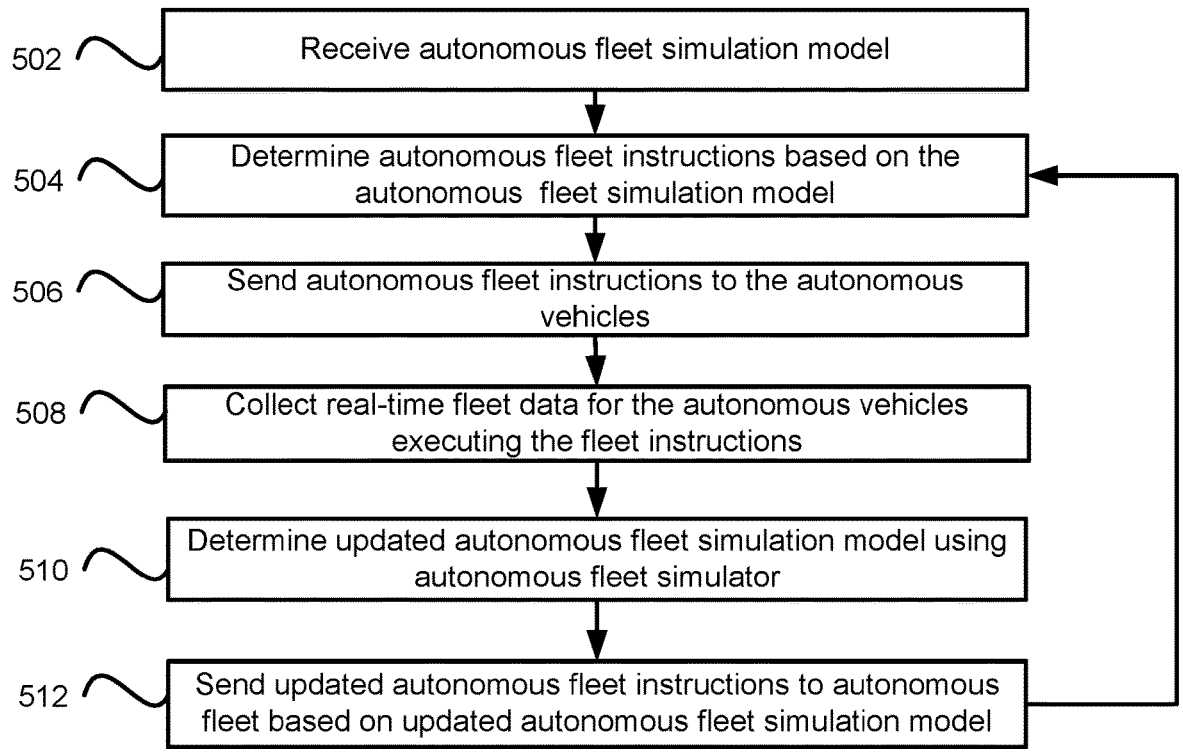
FIG. 5 illustrates an exemplary flow diagram of a method of autonomous fleet management using simulation outputs, in accordance with an embodiment.

FIG. 5 illustrates an exemplary flow diagram of a method of autonomous fleet management using simulation outputs, in accordance with various embodiments. At step 502, an autonomous fleet simulation model, such as may be generated by the embodiment described with respect to FIG. 4, is received at an autonomous fleet simulation system. At step 504, autonomous fleet instructions based on the autonomous fleet simulation model are determined. For example, the model may be utilized in a simulation that indicates that by increasing an amount of time between trips to a charging station taken by autonomous vehicles of the fleet, utilization of the fleet may be increased by 10% (e.g., time spent in rides, as opposed to not in rides). Instructions that direct the autonomous vehicle fleet to implement the simulation parameters (i.e., increasing an amount of time between trips to a charging station) may be determined.

At step 506, autonomous fleet instructions are sent to one or more of the autonomous vehicles in the fleet. For example, instructions may be sent over a network to an autonomous computing device associated with each autonomous vehicle. At step 508, autonomous ride data is collected in substantially real-time from the autonomous vehicles that are executing the autonomous fleet instructions sent at step 506. For example, autonomous vehicle status data (e.g., in-ride, idling, parked, being cleaned, etc.), autonomous ride data (e.g., number of matched rides serviced, number of miles traveled in-ride, etc.), location data (e.g., current location, routes driven in and out of rides, etc.), sensor data (e.g., vehicle speed data, maintenance needs, etc.), and the like.

At step 510, an updated autonomous fleet simulation model is determined by the autonomous fleet simulator. For example, one or more modifications may be received, such as to parameters of the autonomous fleet data, autonomous service entities, autonomous service parameters, etc. For example, a modification to a number of autonomous vehicles may be simulated in the model, as well as multiple new autonomous service entities simulated at various locations throughout the geographical region. In an embodiment, the modifications are determined to increase utilization of one or more of the autonomous vehicles in the simulation or in real-world use. For example, utilization can include various parameters such as ETA values (e.g., average, minimum, maximum, difference between actual and expected ETA, etc.), number of miles traveled during a matched ride, number of miles traveled outside a matched ride, total number of miles traveled over a particular period of time, number of matched rides serviced, charging time, amount of charge needed, refueling time, amount of fuel needed, idling time, time parked, time en route to a pickup location, time en route to a drop-off location, etc.

At step 512, updated autonomous fleet instructions are generated and sent to one or more autonomous vehicles in the autonomous fleet. For example, based on a simulation using the autonomous model, various instructions may be refined. By collecting real-world data, a previous instruction (e.g., reduce the amount of time between charging trips) may be refined to increase utilization metrics (e.g., reduce the amount of time more), and these updated instructions sent to the autonomous fleet.

Figure 6:
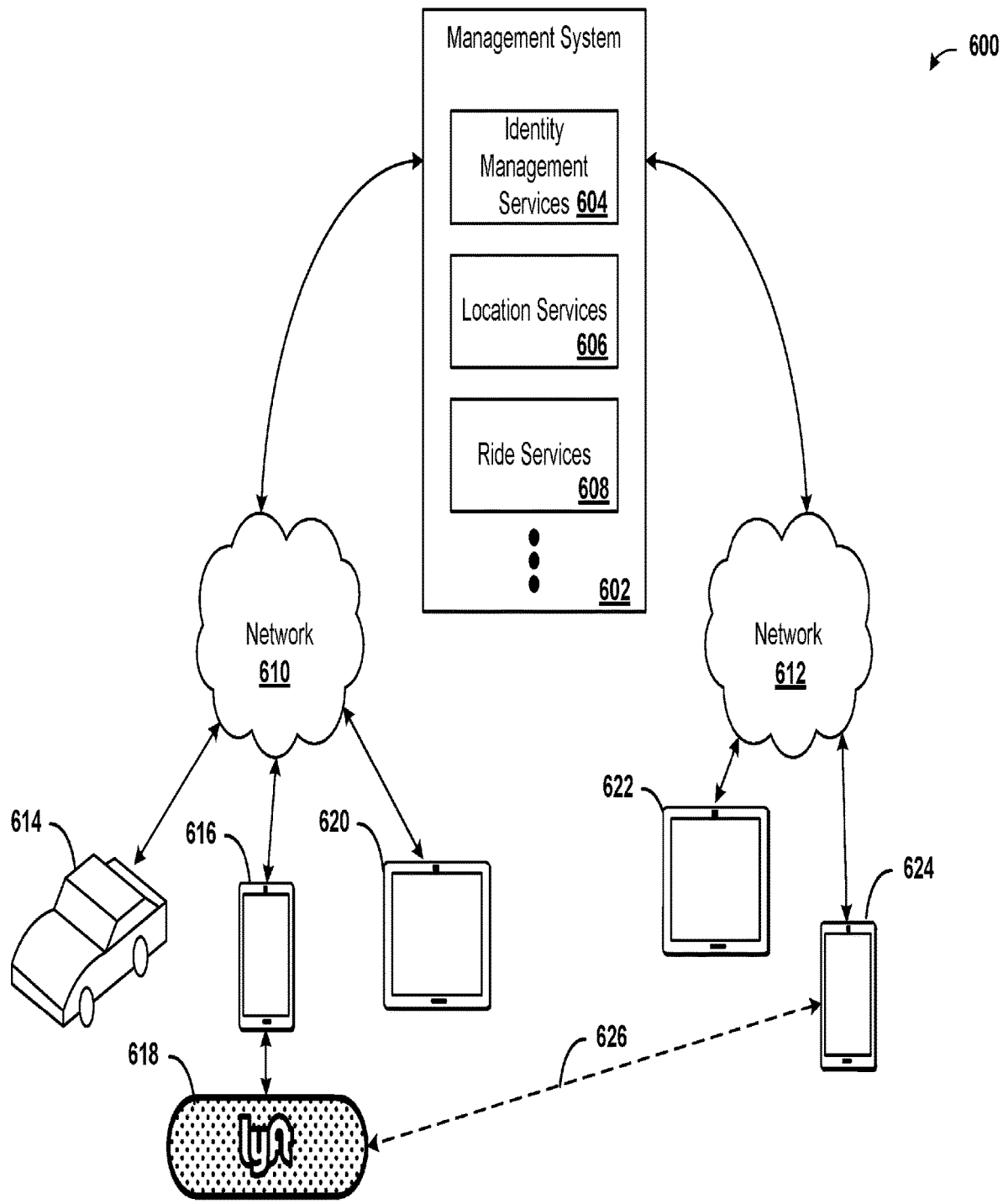
FIG. 6 illustrates an example requestor/provider management environment, in accordance with various embodiments.

FIG. 6 shows a requestor/provider management environment 600, in accordance with various embodiments. As shown in FIG. 6, a management system 602 can be configured to provide various services to requestor and provider devices. Management system 602 can run one or more services or software applications, including identity management services 604, location services 606, ride services 608, or other services. Although three services are shown as being provided by management system 602, more or fewer services may be provided in various implementations. In various embodiments, management system 602 may include one or more general purpose computers, server computers, clustered computing systems, cloud-based computing systems, or any other computing systems or arrangements of computing systems. Management system 602 may be configured to run any or all of the services and/or software applications described with respect to various embodiments described herein. In some embodiments, management system 602 can run any appropriate operating system as well as various server applications, such as common gateway interface (CGI) servers, JAVA® servers, hypertext transport protocol (HTTP) servers, file transfer protocol (FTP) servers, database servers, etc.

For example, identity management services 604 may include various identity services, such as access management and authorization services for requestors and providers when interacting with management system 602. This may include, e.g., authenticating the identity of providers and determining that the providers are authorized to provide services through management system 602. Similarly, requestors' identities may be authenticated to determine whether the requestor is authorized to receive the requested services through management system 602. Identity management services 604 may also control access to provider and requestor data maintained by management system 602, such as driving and/or ride histories, personal data, or other user data. Location services 606 may include navigation and/or traffic management services and user interfaces, or other location services.

In various embodiments, ride services 608 may include ride matching and management services to connect a requestor to a provider, such as the autonomous ride matching system 102 of FIG. 1 and the autonomous matching system 202 of FIG. 2. Ride services 608 may include a user interface and or may receive data from requestors and providers through applications executing on their respective devices. Ride services 608 may, e.g., confirm the identity of requestors and providers using identity management services 604, and determine that each user is authorized for the requested ride service. In some embodiments, ride services 608 can identify an appropriate provider using a location obtained from a requestor and location services 606 to identify, e.g., a closest provider. As such, ride services 608 can manage the distribution and allocation of provider and requestor resources, consistent with embodiments described herein. In some embodiments, the management system 602 may include an autonomous fleet simulation module or system, such as the autonomous fleet simulation system 114 in FIG. 1 and autonomous fleet simulation system 302 in FIG. 3. In other embodiments, the autonomous fleet simulation system may be a separate entity from the management system 602.

Management system 602 can connect to various devices through network 610 and 612. Networks 610, 612 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 610, 612 can include local area networks (LAN), such as Ethernet, Token-Ring or other LANs. Networks 610, 612 can include a wide-area network and/or the Internet. In some embodiments, networks 610, 612 can include VPNs (virtual private networks), PSTNs (a public switched telephone networks), infra-red networks, or any wireless network, including networks implementing the IEEE 602.11 family of standards, Bluetooth®, Bluetooth® Low Energy, NFC and/or any other wireless protocol. In various embodiments, networks 610, 612 can include a mobile network, such as a mobile telephone network, cellular network, satellite network, or other mobile network. Networks 610, 612 may be the same as communication network 170 in FIG. 1. In some embodiments, networks 610, 612 may each include a combination of networks described herein or other networks as are known to one of ordinary skill in the art.

Users may then utilize one or more services provided by management system 602 using applications executing on provider and requestor devices. As shown in FIG. 6, provider computing devices 614, 616, 618, and/or 620 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 610, 612. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 614 can include a vehicle-integrated computing device, such as a vehicle navigation system, or other computing device integrated with the vehicle itself.

In some embodiments, provider computing device 618 can include a provider communication device configured to communicate with users, such as drivers, passengers, pedestrians, and other users. In some embodiments, provider communication device 618 can communicate directly with management system 602 or through another provider computing device, such as provider computing device 616. In some embodiments, a requestor computing device can communicate 626 directly with provider communication device 618 over a peer-to-peer connection, Bluetooth connection, NFC connection, ad hoc wireless network, or any other communication channel or connection. Although particular devices are shown as communicating with management system 602 over networks 610 and 612, in various embodiments, management system 602 can expose an interface, such as an application programming interface (API) or service provider interface (SPI) to enable various third parties which may serve as an intermediary between end users and management system 602.

Although requestor/provider management environment 600 is shown with four provider devices and two requestor devices, any number of devices may be supported. The various components shown and described herein may be implemented in hardware, firmware, software, or combinations thereof. Although one embodiment of a requestor/provider management environment is depicted in FIG. 6, this is merely one implementation and not meant to be limiting.

Figure 7:
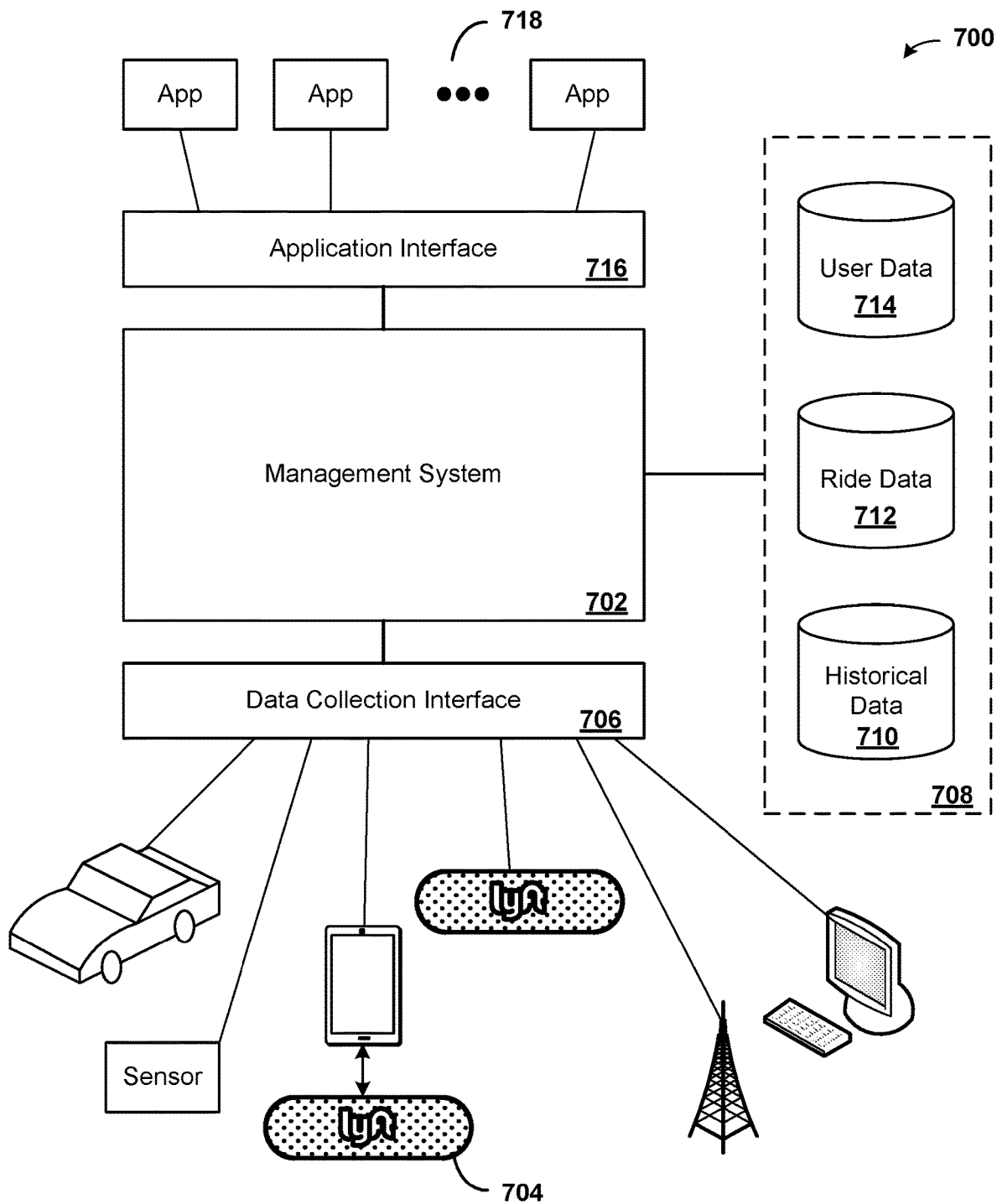
FIG. 7 illustrates an example data collection and application management system, in accordance with various embodiments.

FIG. 7 shows a data collection and application management environment 700, in accordance with various embodiments. As shown in FIG. 7, management system 702 may be configured to collect data from various data collection devices 704 through a data collection interface 706. As discussed above, management system 702 may include one or more computers and/or servers or any combination thereof. Data collection devices 704 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 706 can include, e.g., an extensible device framework configured to support interfaces for each data collection device. In various embodiments, data collection interface 706 can be extended to support new data collection devices as they are released and/or to update existing interfaces to support changes to existing data collection devices. In various embodiments, data collection devices may communicate with data collection interface 706 over one or more networks. The networks may include any network or communication protocol as would be recognized by one of ordinary skill in the art, including those networks discussed above.

As shown in FIG. 7, data received from data collection devices 704 can be stored in data store 708. Data store 708 can include one or more data stores, such as databases, object storage systems and services, cloud-based storage services, and other data stores. For example, various data stores may be implemented on a non-transitory storage medium accessible to management system 702, such as historical data store 710, ride data store 712, and user data store 714. Data stores 708 can be local to management system 702, or remote and accessible over a network, such as those networks discussed above or a storage-area network or other networked storage system. In various embodiments, historical data 710 may include historical traffic data, weather data, request data, road condition data, or any other data for a given region or regions received from various data collection devices. Ride data 712 may include route data, request data, timing data, and other ride related data, in aggregate and/or by requestor or provider. User data 714 may include user account data, preferences, location history, and other user-specific data. Although particular data stores are shown, any data collected and/or stored according to the various embodiments described herein may be stored in data stores 708.

As shown in FIG. 7, an application interface 716 can be provided by management system 702 to enable various apps 718 to access data and/or services available through management system 702. Apps 718 can run on various user devices (including provider and requestor computing devices, such as those discussed above) and/or may include cloud-based or other distributed apps configured to run across various devices (e.g., computers, servers, or combinations thereof). Apps 718 may include, e.g., aggregation and/or reporting apps which may utilize data 708 to provide various services (e.g., third-party ride request and management apps). In various embodiments, application interface 716 can include an API and/or SPI enabling third party development of apps 718. In some embodiments, application interface 716 may include a web interface, enabling web-based access to data 708 and/or services provided by management system 702. In various embodiments, apps 718 may run on devices configured to communicate with application interface 716 over one or more networks. The networks may include any network or communication protocol as would be recognized by one of ordinary skill in the art, including those networks discussed above, in accordance with an embodiment of the present disclosure.

Although a particular implementation of environment 700 is shown in FIG. 7, this is for illustration purposes only and not intended to be limited. In some embodiments, environment 700 may include fewer or more components, as would be recognized by one or ordinary skill in the art.

Figure 8:
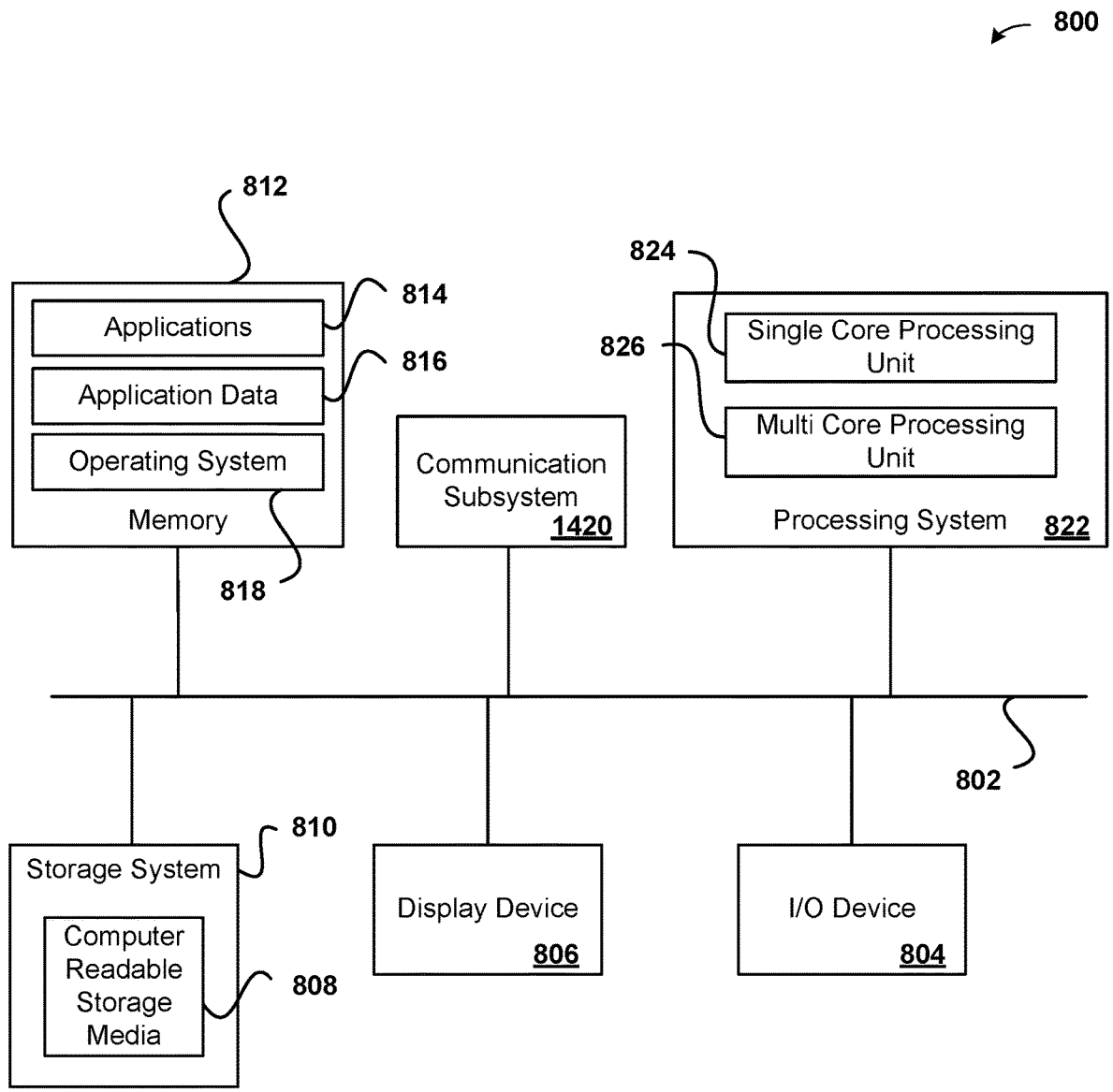
FIG. 8 illustrates an example computer system, in accordance with various embodiments.

FIG. 8 shows an example computer system 800, in accordance with various embodiments. In various embodiments, computer system 800 may be used to implement any of the systems, devices, or methods described herein. In some embodiments, computer system 800 may correspond to any of the various devices described herein, including, but not limited, to mobile devices, tablet computing devices, wearable devices, personal or laptop computers, vehicle-based computing devices, or other devices or systems described herein. As shown in FIG. 8, computer system 800 can include various subsystems connected by a bus 802. The subsystems may include an I/O device subsystem 804, a display device subsystem 806, and a storage subsystem 810 including one or more computer readable storage media 808. The subsystems may also include a memory subsystem 812, a communication subsystem 820, and a processing subsystem 822.

In system 800, bus 802 facilitates communication between the various subsystems. Although a single bus 802 is shown, alternative bus configurations may also be used. Bus 802 may include any bus or other component to facilitate such communication as is known to one of ordinary skill in the art. Examples of such bus systems may include a local bus, parallel bus, serial bus, bus network, and/or multiple bus systems coordinated by a bus controller. Bus 802 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 804 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 804 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 800 may include a display device subsystem 806. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 806 may include a controller and/or interface for controlling and/or communicating with an external display, such as any of the above-mentioned display technologies.

As shown in FIG. 8, system 800 may include storage subsystem 810 including various computer readable storage media 808, such as hard disk drives, solid state drives (including RAM-based and/or flash-based SSDs), or other storage devices. In various embodiments, computer readable storage media 808 can be configured to store software, including programs, code, or other instructions, that is executable by a processor to provide functionality described herein. In some embodiments, storage system 810 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 810 can include a media reader, card reader, or other storage interface to communicate with one or more external and/or removable storage devices. In various embodiments, computer readable storage media 808 can include any appropriate storage medium or combination of storage media. For example, computer readable storage media 808 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include data signals or any other medium through which data can be transmitted and/or received.

Memory subsystem 812 can include various types of memory, including RAM, ROM, flash memory, or other memory. Memory 812 can include SRAM (static RAM) or DRAM (dynamic RAM). In some embodiments, memory 812 can include a BIOS (basic input/output system) or other firmware configured to manage initialization of various components during, e.g., startup. As shown in FIG. 8, memory 812 can include applications 814 and application data 816. Applications 814 may include programs, code, or other instructions, that can be executed by a processor. Applications 814 can include various applications such as browser clients, location management applications, ride management applications, data management applications, and any other application. Application data 816 can include any data produced and/or consumed by applications 814. Memory 812 can additionally include operating system 818, such as macOS®, Windows®, Linux®, various UNIX® or UNIX- or Linux-based operating systems, or other operating systems.

System 800 can also include a communication subsystem 820 configured to facilitate communication between system 800 and various external computer systems and/or networks (such as the Internet, a local area network (LAN), a wide area network (WAN), a mobile network, or any other network). Communication subsystem 820 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. For example, the communication network is shown as communication network 80 in FIG. 1. Additionally, or alternatively, communication subsystem 820 can include hardware and/or software components to communicate with satellite-based or ground-based location services, such as GPS (global positioning system). In some embodiments, communication subsystem 820 may include, or interface with, various hardware or software sensors. The sensors may be configured to provide continuous or and/or periodic data or data streams to a computer system through communication subsystem 820.

As shown in FIG. 8, processing system 822 can include one or more processors or other devices operable to control computing system 800. Such processors can include single core processors 824, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 822, such as processors 824 and 826, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and cited herein are hereby incorporated by reference to the same extent as if each reference were individually and specifically indicated to be incorporated by reference and were set forth in its entirety herein.

What is claimed is:

1. A computer-implemented method comprising:
    performing, based on a fleet simulation model, a first simulation to determine one or more first utilization metrics associated with a fleet of vehicles in a geographic region, wherein the first simulation is based on simulating at least one vehicle of the fleet of vehicles utilizing at least one service entity;
    selecting, for representation in the fleet simulation model, at least one type of service provided by the at least one service entity based on the one or more first utilization metrics from the first simulation;
    adjusting, using the fleet simulation model, a maintenance service schedule of the at least one vehicle of the fleet of vehicles for using the selected at least one type of service;
    updating the fleet simulation model to include the adjusted maintenance service schedule of the at least one vehicle for using the selected at least one type of service;
    performing, based on the updated fleet simulation model, a second simulation to determine one or more second utilization metrics associated with the fleet of vehicles in the geographic region when the at least one vehicle of the fleet of vehicles is serviced according to the adjusted maintenance service schedule;
    determining, based on the second simulation, that the one or more second utilization metrics associated with the fleet of vehicles have updated as compared to the one or more first utilization metrics associated with the fleet of vehicles based on the first simulation; and in response to determining that the one or more second utilization metrics associated with the fleet of vehicles have updated, transmitting, to at least one computing device associated with the at least one vehicle, instructions for causing the at least one vehicle to travel in the geographic region based on the updated fleet simulation model.

2. The method of claim 1, further comprising:
in response to selecting the at least one type of service, configuring the fleet simulation model using fleet data associated with the fleet of vehicles and the selected at least one type of service provided by the at least one service entity.

3. The method of claim 1, further comprising associating one or more parameters with the selected at least one type of service, wherein the one or more parameters comprise times of and/or time required for the selected at least one type of service or a number of vehicles capable of being serviced by the at least one service entity providing the selected at least one type of service.

4. The method of claim 1, wherein the at least one service entity provides a function including at least one parking, charging, fueling, cleaning, repair, updating a software, or maintenance of the at least one vehicle.

5. The method of claim 1, further comprising:
in response to performing the first simulation, determining a geographic location for the at least one service entity; and
updating the fleet simulation model to include the at least one service entity at the geographic location.

6. The method of claim 1, wherein the maintenance service schedule is based on a capacity of the at least one service entity and a predicted number of ride requests.

7. The method of claim 1, wherein:
the fleet simulation model is configured to simulate various fleet scenarios comprising geographic constraints, fleet constraints, or infrastructure constraints to predict one or more outcomes with respect to the one or more first utilization metrics or the one or more second utilization metrics; and
the one or more outcomes comprise minimizing, by the at least one vehicle, a total number of miles traveled, estimated times of arrival (ETA) to service a ride request, or estimated amount of time being serviced at the at least one service entity.

8. One or more computer-readable non-transitory storage media embodying software that is operable when executed to cause one or more processors to perform operations comprising:
performing, based on a fleet simulation model, a first simulation to determine one or more first utilization metrics associated with a fleet of vehicles in a geographic region, wherein the first simulation is based on simulating at least one vehicle of the fleet of vehicles utilizing at least one service entity;
selecting, for representation in the fleet simulation model, at least one type of service provided by the at least one service entity based on the one or more first utilization metrics from the first simulation;
adjusting, using the fleet simulation model, a maintenance service schedule of the at least one vehicle of the fleet of vehicles for using the selected at least one type of service;

updating the fleet simulation model to include the adjusted maintenance service schedule of the at least one vehicle for using the selected at least one type of service;
performing, based on the updated fleet simulation model, a second simulation to determine one or more second utilization metrics associated with the fleet of vehicles in the geographic region when the at least one vehicle of the fleet of vehicles is serviced according to the adjusted maintenance service schedule;
determining, based on the second simulation, that the one or more second utilization metrics associated with the fleet of vehicles have updated as compared to the one or more first utilization metrics associated with the fleet of vehicles based on the first simulation; and
in response to determining that the one or more second utilization metrics associated with the fleet of vehicles have updated, transmitting, to at least one computing device associated with the at least one vehicle, instructions for causing the at least one vehicle to travel in the geographic region based on the updated fleet simulation model.

9. The one or more computer-readable non-transitory storage media of claim 8, wherein the software is further operable to:
in response to selecting the at least one type of service, configure the fleet simulation model using fleet data associated with the fleet of vehicles and the selected at least one type of service provided by the at least one service entity.

10. The one or more computer-readable non-transitory storage media of claim 8, wherein the software is further operable to associate one or more parameters with the selected at least one type of service, wherein the one or more parameters comprise times of and/or time required for the selected at least one type of service or a number of vehicles capable of being serviced by the at least one service entity providing the selected at least one type of service.

11. The one or more computer-readable non-transitory storage media of claim 8, wherein the at least one service entity provides a function including at least one parking, charging, fueling, cleaning, repair, updating a software, or maintenance of the at least one vehicle.

12. The one or more computer-readable non-transitory storage media of claim 8, wherein the software is further operable to:
in response to performing the first simulation, determine a geographic location for the at least one service entity; and
update the fleet simulation model to include the at least one service entity at the geographic location.

13. The one or more computer-readable non-transitory storage media of claim 8, wherein the maintenance service schedule is based on a capacity of the at least one service entity and a predicted number of ride requests.

14. The one or more computer-readable non-transitory storage media of claim 8, wherein:
the fleet simulation model is configured to simulate various fleet scenarios comprising geographic constraints, fleet constraints, or infrastructure constraints to predict one or more outcomes with respect to the one or more first utilization metrics or the one or more second utilization metrics; and
the one or more outcomes comprise minimizing, by the at least one vehicle, a total number of miles traveled, estimated times of arrival (ETA) to service a ride request, or estimated amount of time being serviced at the at least one service entity.

15. A computing system comprising:

one or more processors; and one or more computer-readable non-transitory storage media coupled to one or more of the processors, the one or more computer-readable non-transitory storage media comprising instructions operable when executed by one or more of the processors to cause the computing system to perform operations comprising:

performing, based on a fleet simulation model, a first simulation to determine one or more first utilization metrics associated with a fleet of vehicles in a geographic region, wherein the first simulation is based on simulating at least one vehicle of the fleet of vehicles utilizing at least one service entity;

selecting, for representation in the fleet simulation model, at least one type of service provided by the at least one service entity based on the one or more first utilization metrics from the first simulation;

adjusting, using the fleet simulation model, a maintenance service schedule of the at least one vehicle of the fleet of vehicles for using the selected at least one type of service;

updating the fleet simulation model to include the adjusted maintenance service schedule of the at least one vehicle for using the selected at least one type of service;

performing, based on the updated fleet simulation model, a second simulation to determine one or more second utilization metrics associated with the fleet of vehicles in the geographic region when the at least one vehicle of the fleet of vehicles is serviced according to the adjusted maintenance service schedule;

determining, based on the second simulation, that the one or more second utilization metrics associated with the fleet of vehicles have updated as compared to the one or more first utilization metrics associated with the fleet of vehicles based on the first simulation; and in response to determining that the one or more second utilization metrics associated with the fleet of vehicles have updated, transmitting, to at least one computing device associated with the at least one vehicle, instructions for causing the at least one vehicle to travel in the geographic region based on the updated fleet simulation model.

16. The system of claim 15, wherein the processors are further operable to:

in response to selecting the at least one type of service, configure the fleet simulation model using fleet data associated with the fleet of vehicles and the selected at least one type of service provided by the at least one service entity.

17. The system of claim 15, wherein the processors are further operable to associate one or more parameters with the selected at least one type of service, wherein the one or more parameters comprise times of and/or time required for the selected at least one type of service or a number of vehicles capable of being serviced by the at least one service entity providing the selected at least one type of service.

18. The system of claim 15, wherein the at least one service entity provides a function including at least one parking, charging, fueling, cleaning, repair, updating a software, or maintenance of the at least one vehicle.

19. The system of claim 15, wherein the processors are further operable to:

in response to performing the first simulation, determine a geographic location for the at least one service entity; and update the fleet simulation model to include the at least one service entity at the geographic location.

20. The system of claim 15, wherein the maintenance service schedule is based on a capacity of the at least one service entity and a predicted number of ride requests.

\* \* \* \* \*